United States Patent
Zhang et al.

(10) Patent No.: US 8,614,930 B2
(45) Date of Patent: Dec. 24, 2013

(54) SYSTEM AND METHOD FOR SEISMIC DATA MODELING AND MIGRATION

(75) Inventors: Linbin Zhang, Danville, CA (US); Guojian Shan, San Ramon, CA (US); Yue Wang, Danville, CA (US)

(73) Assignee: Chevron U.S.A. Inc., San Ramon, CA (US)

( * ) Notice: Subject to any disclaimer, the term of this patent is extended or adjusted under 35 U.S.C. 154(b) by 310 days.

(21) Appl. No.: 13/069,951

(22) Filed: Mar. 23, 2011

(65) Prior Publication Data

US 2012/0243371 A1    Sep. 27, 2012

(51) Int. Cl.
*G01V 1/36* (2006.01)
*G01V 1/28* (2006.01)

(52) U.S. Cl.
USPC .................................. 367/43; 367/38; 702/17

(58) Field of Classification Search
USPC .............................. 367/38, 43, 50, 51; 702/17
See application file for complete search history.

(56) References Cited

U.S. PATENT DOCUMENTS

| | | | |
|---|---|---|---|
| 3,701,091 A * | 10/1972 | Lenihan | 367/45 |
| 4,535,417 A * | 8/1985 | Peacock | 708/300 |
| 4,837,723 A * | 6/1989 | Peacock | 708/300 |
| 5,060,202 A | 10/1991 | Meek et al. | |
| 5,189,644 A * | 2/1993 | Wood | 367/38 |
| 5,657,223 A * | 8/1997 | Juszczak et al. | 705/400 |
| 5,999,488 A | 12/1999 | Smith | |
| 6,687,617 B2 | 2/2004 | Kelly | |
| 6,778,909 B1 | 8/2004 | Popovici et al. | |
| 7,376,539 B2 | 5/2008 | Lecomte | |
| 8,223,587 B2 * | 7/2012 | Krebs et al. | 367/43 |
| 2008/0175101 A1 | 7/2008 | Saenger et al. | |
| 2009/0292475 A1 | 11/2009 | Alam et al. | |
| 2010/0054082 A1 * | 3/2010 | McGarry et al. | 367/53 |
| 2010/0088035 A1 | 4/2010 | Etgen et al. | |
| 2010/0097888 A1 * | 4/2010 | Neelamani et al. | 367/53 |
| 2010/0161234 A1 | 6/2010 | Saenger et al. | |

OTHER PUBLICATIONS

Lassley, Richard H., "An Introduction to Linear Time-Varyiant Digital Filtering in Seismic Data", Dissertation presented to the Faculty of the Graduate School University of Missouri at Rolla, May 1965.*
Gray, Samuel H; Etgen, John; Dellinger, Joe; Dellinger, Joe; Whitmore, Dan, Seismic migration problems and solutions, p. 1-77, (2001).

* cited by examiner

*Primary Examiner* — Ian J Lobo
(74) *Attorney, Agent, or Firm* — Marie L. Clapp

(57) ABSTRACT

A system and computer-implemented method for accounting for temporal dispersion in low-order finite difference seismic wave propagation is disclosed. An embodiment of the method includes transforming a seismic dataset from time domain to frequency domain to obtain a frequency-domain seismic dataset, applying a frequency-domain time varying filter to the frequency-domain seismic dataset to obtain a filtered frequency-domain seismic dataset, and transforming the filtered frequency-domain seismic dataset from the frequency domain to the time domain to obtain a time-domain filtered seismic dataset. The frequency-domain time varying filter is based on the effective phase velocity inherent in a finite-difference solution to the wave equation. The frequency-domain time varying filter may be applied to a synthetic seismic dataset that was generated by low-order finite difference modeling. A different frequency-domain time varying filter may be applied to recorded seismic data prior to reverse time migration.

15 Claims, 6 Drawing Sheets

SYSTEM AND METHOD FOR SEISMIC DATA MODELING AND MIGRATION

TECHNICAL FIELD

The present invention relates generally to methods and systems for modeling and migrating seismic data using finite difference modeling operators, and in particular methods and systems for accounting for temporal dispersion caused by the use of low-order finite difference modeling operators for seismic data modeling and migration.

BACKGROUND OF THE INVENTION

Accurate migration of 3D seismic data enables proper interpretation of subterranean hydrocarbon reservoirs. Seismic migration is essentially the process of reversing seismic wave propagation; therefore much effort has been put into modeling seismic wave propagation as accurately as possible. One method of modeling seismic wave propagation is finite difference modeling.

In finite difference modeling, the solution to the wave equation is approximated using a finite difference (FD) method. This method can produce multiple approximate solutions that are referred to according to their order, for example second-order FD and fourth-order FD, which indicates how accurately they represent the true solution to the wave equation. When a second-order FD solution is used to model seismic wave propagation, the resultant synthetic seismic data has significant temporal dispersion due to the low accuracy of the FD solution. Higher order FD solutions such as fourth-order produce synthetic seismic data with less temporal dispersion. The improved accuracy of higher order solutions comes at a great computational cost. For example, fourth-order FD seismic modeling requires twice as many computing operations as second-order FD.

Another method that can be used to improve modeling accuracy is a pseudo-analytic operator such as a pseudo-Laplacian. This method is similar to second-order FD modeling except it modifies the spatial and temporal derivatives so that they have opposite signs and, by adjusting the coefficients, the errors in the derivatives will counteract each other, thereby reducing the inaccuracy in the result. This method is more accurate than second-order FD modeling and not as computationally expensive as fourth-order FD modeling. However, pseudo-analytic methods are still more expensive than second-order FD modeling.

The computational cost associated with using higher order FD modeling or pseudo-analytic methods becomes even more significant when considered in terms of reverse time migration (RTM). In reverse time migration, a source wavefield is propagated forward into the subsurface, often using FD or pseudo-analytic modeling, while a recorded seismic dataset is propagated backwards into the subsurface. The two wavefields are matched at subsurface locations via an imaging condition, often zero-lag cross-correlation, to create an image. The recorded seismic dataset is the true result of seismic energy that has passed through the subsurface and, as such, does not have the temporal dispersion that arises from the approximated FD or pseudo-analytic modeling. In order for the forward propagated synthetic seismic data to match the backward propagated recorded seismic data, the temporal dispersion must be accounted for. Therefore, current RTM methods use higher order FD or pseudo-analytic modeling.

Current practice for FD seismic modeling and RTM uses pseudo-Laplacian methods or higher order FD methods. These methods are more accurate and more computationally expensive than conventional second-order FD modeling.

SUMMARY OF THE INVENTION

According to one implementation of the present invention, a method for accounting for temporal dispersion includes transforming a seismic dataset from time domain to frequency domain to obtain a frequency-domain seismic dataset, applying a frequency-domain time varying filter to the frequency-domain seismic dataset to obtain a filtered frequency-domain seismic dataset, and transforming the filtered frequency-domain seismic dataset from the frequency domain to the time domain to obtain a time-domain filtered seismic dataset. The frequency-domain time varying filter is based on the effective phase velocity inherent in a finite-difference solution to the wave equation. The frequency-domain time varying filter may be applied to a synthetic seismic dataset that was generated by low-order finite difference modeling.

In another embodiment, the frequency-domain time varying filter may be applied to recorded seismic data prior to reverse time migration. The reverse time migration may then use low-order finite difference modeling to forward propagate the source wavefield.

The present invention may also be practiced as a system for accounting for temporal dispersion in seismic processing methods using low-order finite difference modeling. The system may include a device for providing information representative of the subterranean area of interest and a computer processor in communication with the device and configured to receive the data and to execute a computer executable code responsive to the data. The computer executable code may include a domain transformation module capable of transforming from a time domain to a frequency domain and/or from the frequency domain to the time domain, and a frequency-domain filter application module for applying a frequency-domain time varying filter. The system may also include a user interface. In one embodiment, the system may include a reverse time migration module.

The present invention may also be practiced as an article of manufacture including a computer readable medium having computer readable code on it, the computer readable code being configured to implement a method for accounting for temporal dispersion in low-order finite difference wave propagation. The method may include transforming a seismic dataset from time domain to frequency domain to obtain a frequency-domain seismic dataset, applying a frequency-domain time varying filter to the frequency-domain seismic dataset to obtain a filtered frequency-domain seismic dataset, and transforming the filtered frequency-domain seismic dataset from the frequency domain to the time domain to obtain a time-domain filtered seismic dataset. The frequency-domain time varying filter is based on the effective phase velocity inherent in a finite-difference solution to the wave equation.

The above summary section is provided to introduce a selection of concepts in a simplified form that are further described below in the detailed description section. The summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

These and other features of the present invention will become better understood with regard to the following description, pending claims and accompanying drawings where:

DETAILED DESCRIPTION OF THE INVENTION

Figure 1:
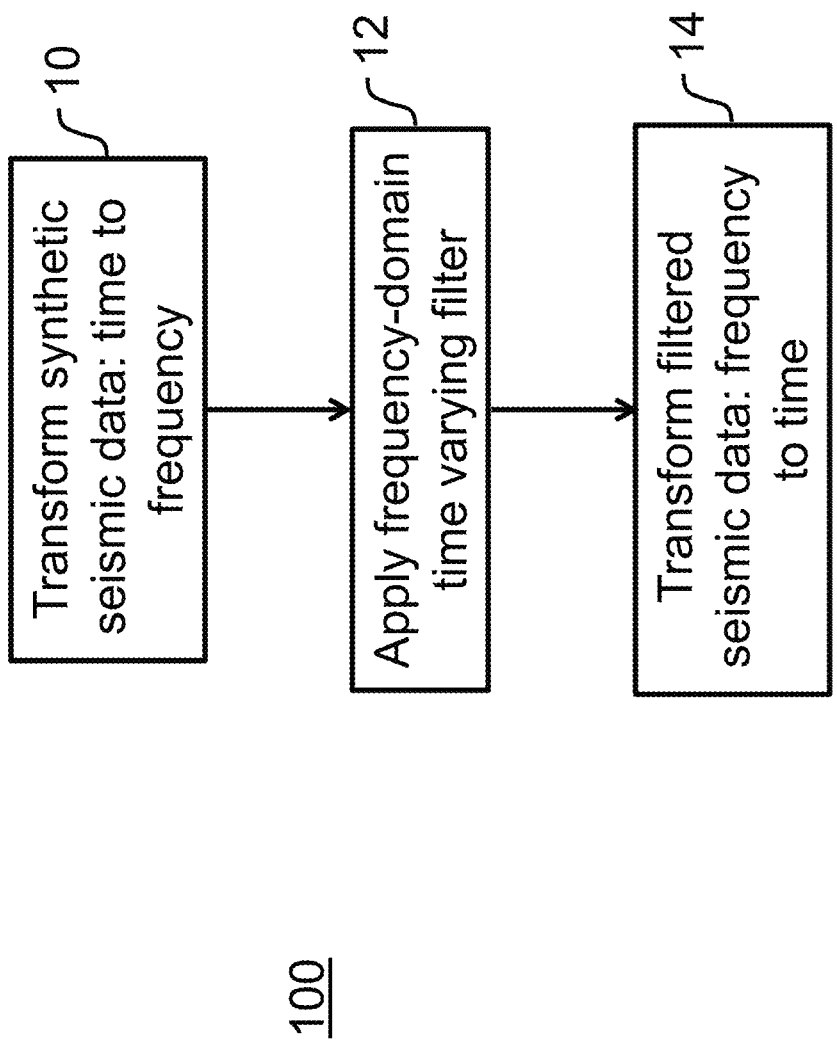
FIG. 1 is a flowchart illustrating a method for performing seismic data modeling in accordance with an embodiment of the invention.

The present invention may be described and implemented in the general context of a system and computer methods to be executed by a computer. Such computer-executable instructions may include programs, routines, objects, components, data structures, and computer software technologies that can be used to perform particular tasks and process abstract data types. Software implementations of the present invention may be coded in different languages for application in a variety of computing platforms and environments. It will be appreciated that the scope and underlying principles of the present invention are not limited to any particular computer software technology.

Moreover, those skilled in the art will appreciate that the present invention may be practiced using any one or combination of hardware and software configurations, including but not limited to a system having single and/or multiple computer processors, hand-held devices, programmable consumer electronics, mini-computers, mainframe computers, and the like. The invention may also be practiced in distributed computing environments where tasks are performed by servers or other processing devices that are linked through a one or more data communications network. In a distributed computing environment, program modules may be located in both local and remote computer storage media including memory storage devices.

Also, an article of manufacture for use with a computer processor, such as a CD, pre-recorded disk or other equivalent devices, may include a computer program storage medium and program means recorded thereon for directing the computer processor to facilitate the implementation and practice of the present invention. Such devices and articles of manufacture also fall within the spirit and scope of the present invention.

Referring now to the drawings, embodiments of the present invention will be described. The invention can be implemented in numerous ways, including for example as a system (including a computer processing system), a method (including a computer implemented method), an apparatus, a computer readable medium, a computer program product, a graphical user interface, a web portal, or a data structure tangibly fixed in a computer readable memory. Several embodiments of the present invention are discussed below. The appended drawings illustrate only typical embodiments of the present invention and therefore are not to be considered limiting of its scope and breadth.

The present invention relates to accounting for temporal dispersion in finite difference seismic data modeling and, by way of example and not limitation, can be used to reduce temporal dispersion in synthetic seismic data generated by low-order finite difference modeling or to introduce temporal dispersion into recorded seismic data prior to reverse time migration that uses low-order finite difference modeling as its forward propagator. The temporal dispersion is characterized through a frequency-domain time varying filter.

The inventor has determined that it is possible to generate a frequency-domain time varying filter based on the effective phase velocity inherent in a finite difference solution to the wave equation. The low-order finite difference solutions, such as the second-order solution, will be inaccurate and will introduce temporal dispersion in synthetic seismic data generated by low-order finite difference (FD) modeling. Further, the inventor has determined that by applying the frequency-domain time varying filter to synthetic seismic data created by low-order FD modeling, the temporal dispersion can be reduced. Additionally, it is possible to use the negative frequency-domain time varying filter to add temporal dispersion to recorded seismic data so that it can be used as input to a reverse time migration method utilizing low-order FD modeling as its forward propagator.

In this regard, an example of a method 100 in accordance with the present invention is illustrated in the flowchart of FIG. 1. At step 10, a synthetic seismic dataset is transformed from the time domain to the frequency domain. This may be done, for example, by a fast Fourier transform. In an embodiment, the synthetic seismic dataset was generated by a low-order finite difference (FD) modeling operator, such as and not limited to a second-order FD modeling operator. A low-order FD modeling operator is one that is based on a finite difference solution to the wave equation and is known to be inaccurate but is used because it is less computationally expensive than a high-order FD modeling operator.

At step 12, the synthetic seismic dataset that is now in the frequency domain has a frequency-domain time varying filter applied to it. This frequency-domain time varying filter is designed based on the effective phase velocity that is inherent in a low-order FD solution to the wave equation. As an example of how the filter may be constructed, for the 3D acoustic wave equation $$\frac{\partial^2 P}{\partial t^2} = V^2 \nabla^2 P \qquad \text{Eqn. 1}$$

wherein P is the wavefield, t is the travel time and V is the velocity, the second-order finite difference solution may be written as:

$$P(t+\Delta t) - 2P(t) + P(t-\Delta t) = \Delta t^2 V^2 \nabla^2 P. \qquad \text{Eqn. 2}$$

Taking the Fourier transform of Eqn. 2 results in $$(2\cos(\omega \Delta t) - 2) P(\omega, k) \cong -\Delta t^2 V^2 k^2 P(\omega, k) \qquad \text{Eqn. 3}$$

where k is the wavenumber. From this result, it is possible to determine the effective phase velocity for the second-order FD solution. In this case, the effective phase velocity $V_a$ from Eqn. 3 can be expressed as:

$$V_a = \frac{\omega}{k} = \frac{\omega \Delta t}{\sqrt{2 - 2\cos(\omega \Delta t)}} V.$$ Eqn. 4

From Eqn. 4, it is evident that $V_a$ is frequency dependent and different from the true velocity V. The difference between V and $V_a$ produces a time delay, or temporal dispersion, in a wavefield that is propagated according to this FD solution. The temporal dispersion can be mathematically described by:

$$T - T_{true} = T\left(1 - \frac{T_{true}}{T}\right) = T\left(1 - \frac{V_a}{V}\right) = T\left(1 - \frac{\omega \Delta t}{\sqrt{2 - 2\cos(\omega \Delta t)}}\right),$$ Eqn. 5 where T represents the traveltime computed by the finite difference modeling and $T_{true}$ is the traveltime using the true velocity. Since the temporal dispersion is defined, a frequency-domain time varying filter $F(\omega, T)$ can be designed to compensate for it:

$$F(\omega, T) = \exp\left(-i\omega T\left(1 - \frac{\omega \Delta t}{\sqrt{2 - 2\cos(\omega \Delta t)}}\right)\right).$$ Eqn. 6

Applying this filter to synthetic seismic data generated by second-order FD modeling, as is done in step 12, reduces the temporal dispersion.

Figure 2:
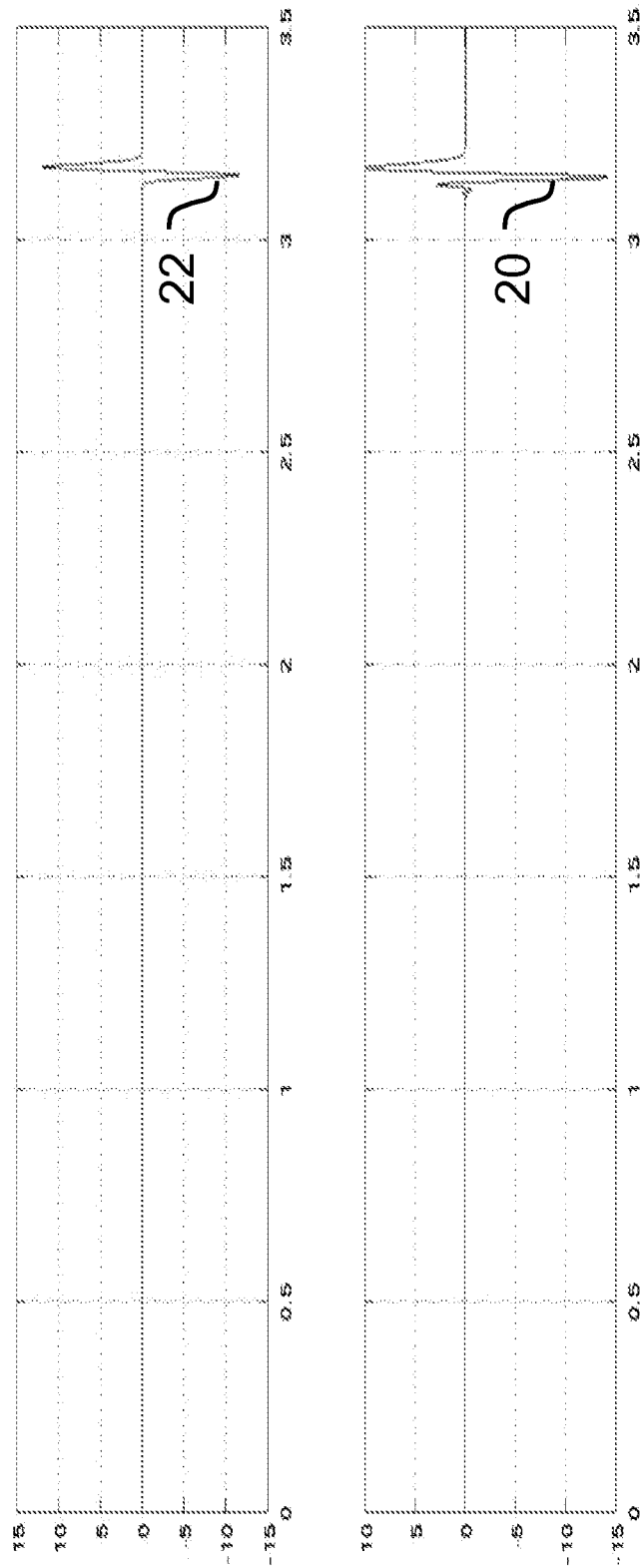
FIG. 2 shows a wavelet that was propagated using a conventional second-order FD method and the result of applying the frequency-domain time varying filter of the present invention to that wavelet.

The effect of the filter in Eqn. 6 can be seen in FIG. 2. In this example, a single wavelet shown as curve 20 has been propagated by second-order FD modeling. The result shows the anticipated phase distortion as a small peak prior to the main arrival and the unequal positive and negative large peaks that are characteristic of temporal dispersion caused by the inaccurate FD solution. Applying the filter of Eqn. 6 to curve 20 produces curve 22, which shows no signs of temporal dispersion.

Figure 3:
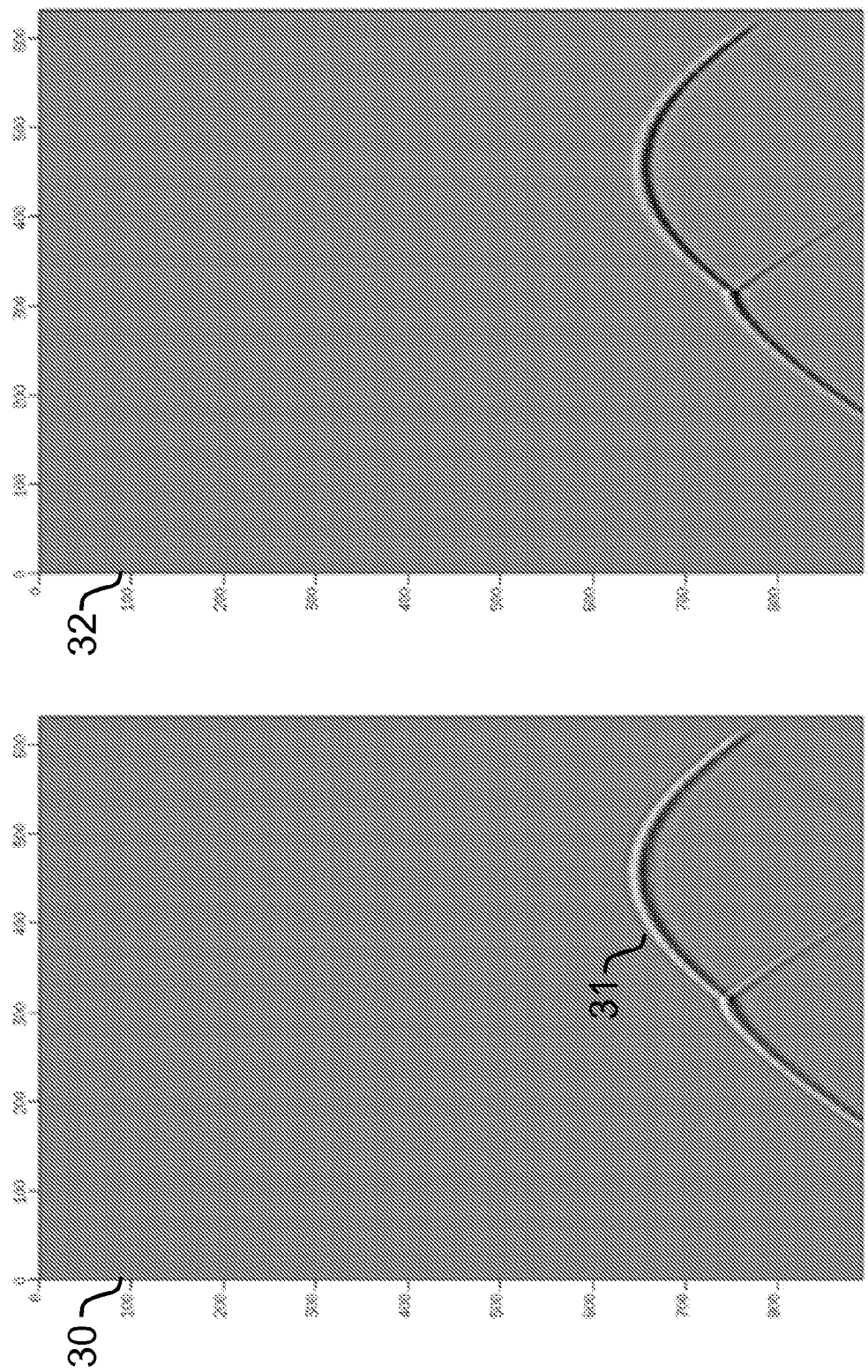
FIG. 3 is an example of seismic data modeling using a conventional second-order FD method compared to seismic data modeling using the present invention.

Referring again to FIG. 1, after the filter of Eqn. 6 is applied to the frequency-domain seismic data, the data is transformed back into the time domain at step 14. An example of method 100 can be seen in FIG. 3. Panel 30 shows a wavefield that was propagated by a second-order FD modeling operator. The temporal dispersion is indicated by the arrow 31. Panel 32 shows the data after performing method 100. The temporal dispersion is greatly reduced.

Figure 4:
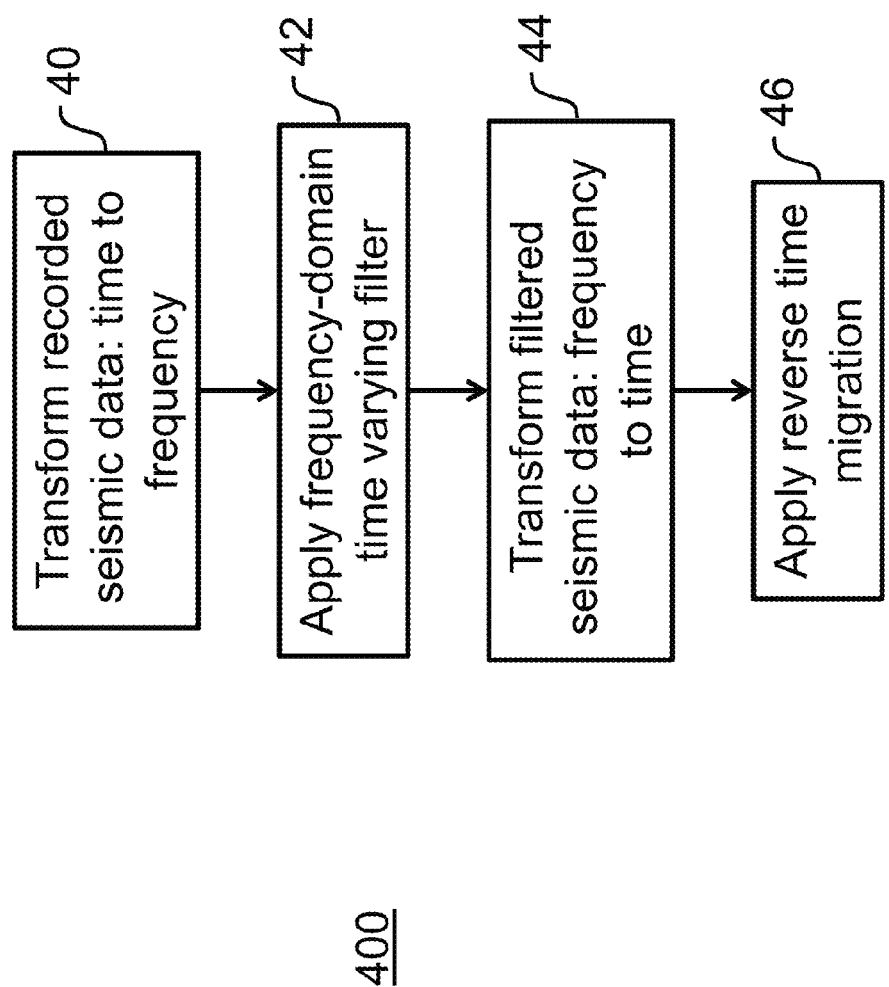
FIG. 4 is a flowchart illustrating a method for performing reverse time migration (RTM) in accordance with an embodiment of the invention.

Another embodiment of the present invention is illustrated in the flowchart of FIG. 4. In this embodiment, a frequency-domain time varying filter is used to prepare recorded seismic data for migration by a reverse time migration (RTM) algorithm. The recorded seismic dataset represents seismic energy that was generated by a seismic source, propagated through the subsurface, refracting and reflecting depending on differences in seismic velocity and density of the subsurface rock layers, and was recorded by seismic receivers. As such, the recorded seismic data represents the true solution to the wave equation and so does not have the temporal dispersion that is caused by inaccuracies in FD modeling. In RTM, the recorded seismic dataset or wavefield is backward propagated into the subsurface while a source wavefield is forward propagated using a FD or pseudo-analytic method. The two wavefields are subjected to an imaging condition to create the migrated image. A typical imaging condition is a zero-lag cross-correlation:

$$I(x,y,z) = S(x,y,z,t) * R(x,y,z,t)$$ Eqn. 7 where $I(x,y,z)$ is the migrated image, $S(x,y,z,t)$ is the source wavefield that is forward propagated by a FD or pseudo-analytic method, and $R(x,y,z,t)$ is the recorded wavefield that is backward propagated. Due to the zero-lag cross-correlation, any temporal dispersion that occurs in just the forward propagated source wavefield will cause artifacts in the migrated image and depth mispositioning. Typically, RTM uses the more computationally expensive high-order FD or pseudo-analytic modeling to reduce the temporal dispersion. However, if the temporal dispersion in both the source and recorded wavefields are the same, the zero-lag cross correlation imaging condition will not cause artifacts. This embodiment of the present invention creates temporal dispersion in the recorded seismic data so that it may be used as input for RTM using the computationally cheaper low-order FD modeling operator for the source wavefield while reducing artifacts.

In method 400, step 40 transforms a recorded seismic dataset into the frequency domain. This may be done, for example, by a fast Fourier transform. The frequency-domain data has a frequency-domain time varying filter applied in step 42. This filter is generated based on the effective phase velocity from the FD solution, as was the filter derived for the method 100, but in this embodiment the filter will introduce temporal dispersion rather than reduce it. For a second-order FD solution, the frequency-domain time varying filter that will be applied to the frequency-domain recorded seismic data is $$F(\omega, T) = \exp\left(i\omega T\left(1 - \frac{\omega \Delta t}{\sqrt{2 - 2\cos(\omega \Delta t)}}\right)\right).$$ Eqn. 8

Note that this filter is almost identical to the filter of method 100 shown in Eqn. 6; only the sign on the exponent is different.

In step 44, the filtered recorded dataset is transformed back into the time domain. In step 46, the filtered recorded dataset is used as input for RTM which uses a FD modeling operator of the same order as the FD solution used to derive the frequency-domain time varying filter. It should be noted that if the RTM method is prepared to take frequency-domain recorded seismic data as input, step 44 may be skipped.

Figure 5:
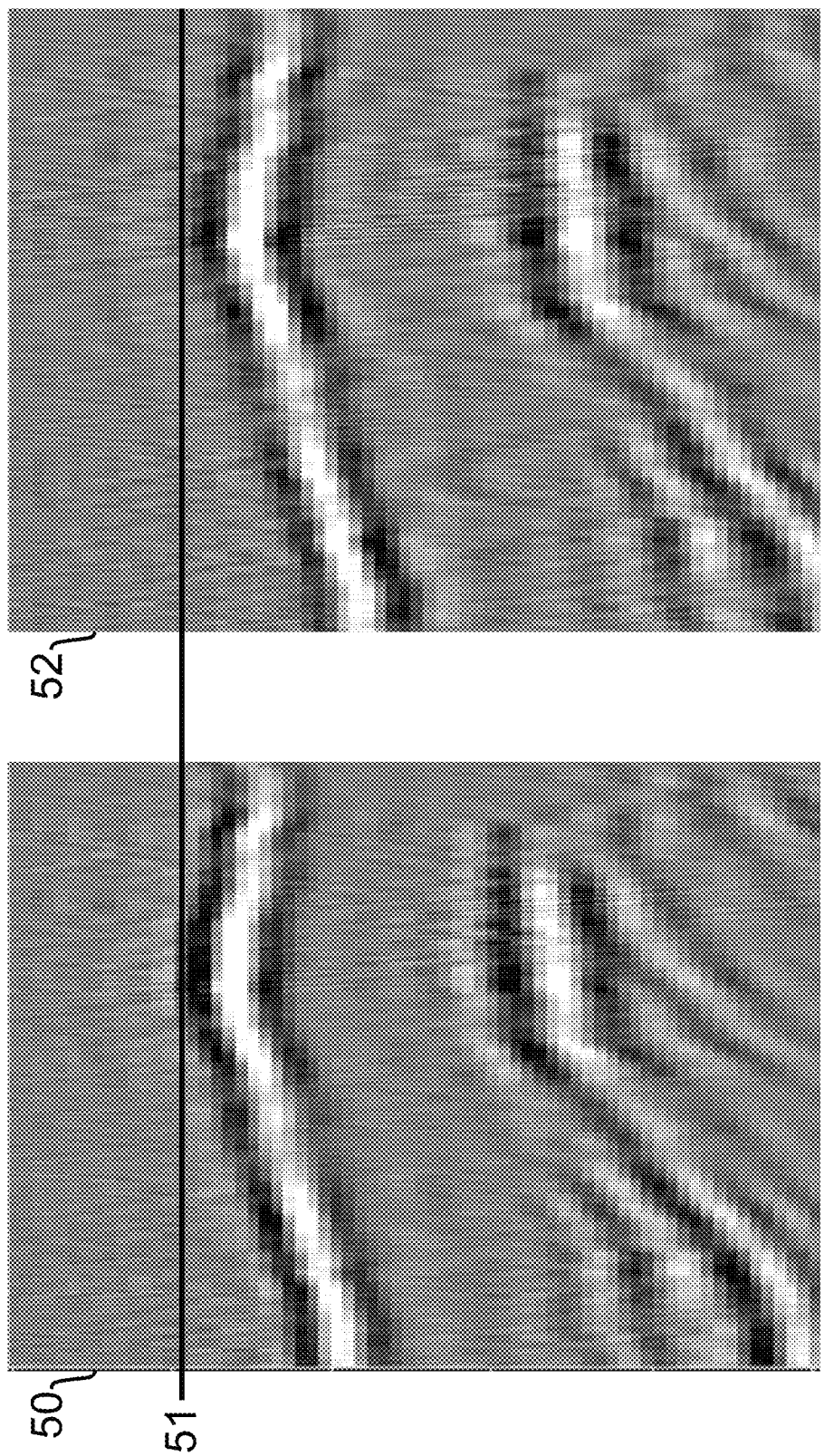
FIG. 5 is an example of reverse time migration using a conventional second-order FD method compared to reverse time migration using the present invention.

An example of the method 400 may be seen in FIG. 5. Panel 50 shows a RTM result that used a second-order FD modeling operator to propagate the source wavefield and used the recorded seismic dataset without applying a frequency-domain time varying filter. Panel 52 shows a RTM result produced by method 400. Line 51 is a horizontal reference that helps to demonstrate the difference in vertical positioning of the seismic reflector. This reflector is located at the correct depth in panel 52; in panel 50, the use of the low-order FD modeling operator and the unfiltered recorded seismic data has resulted in artifacts that make the reflector appear to be shallower than it should be and has apparently changed the phase of the wavelet. The effects can also be seen in the packet of seismic reflectors deeper in the images. The difference in depth between the two panels is on the order of tens of meters, which is a significant difference when trying to place a well.

Figure 6:
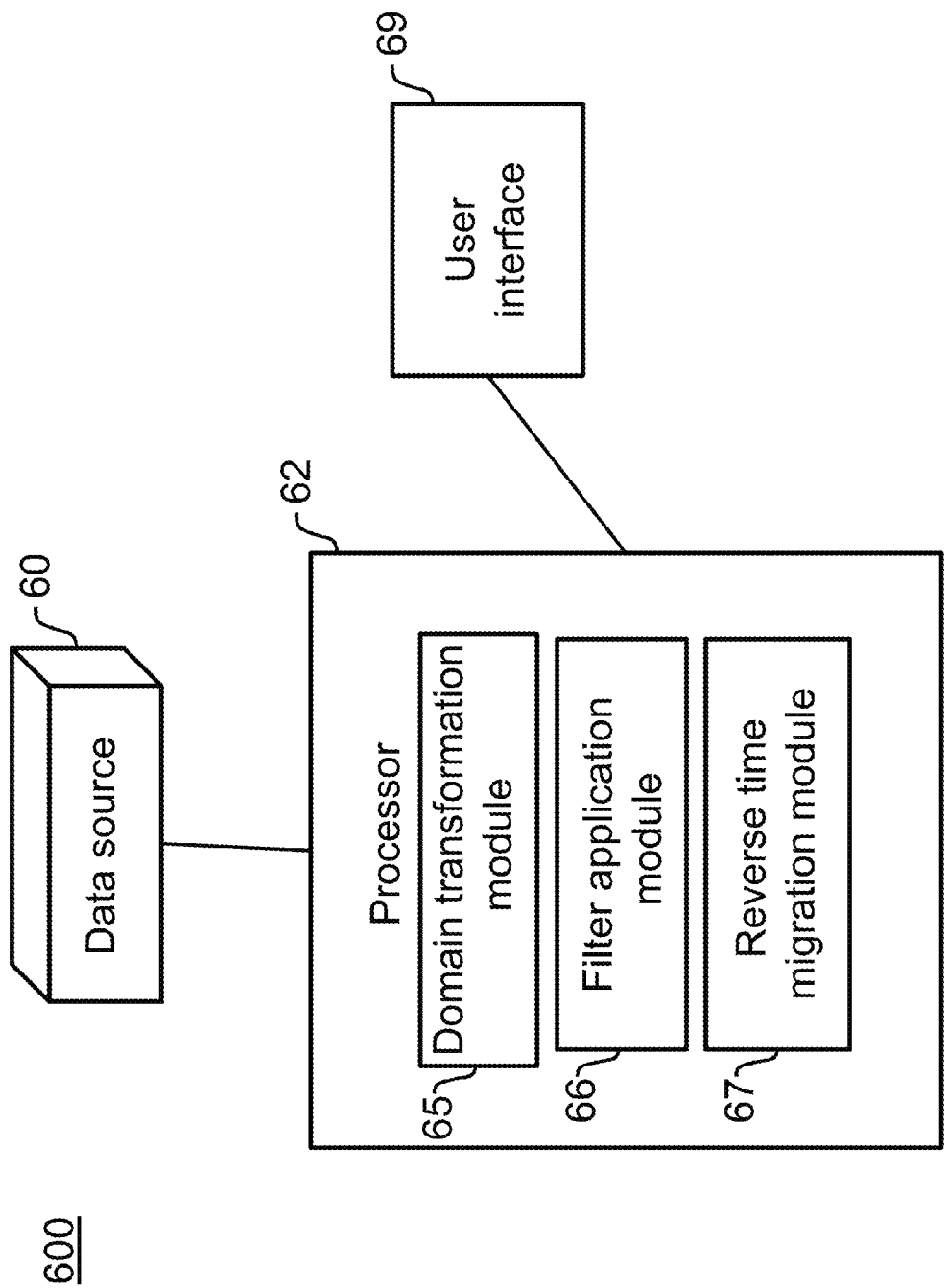
FIG. 6 schematically illustrates a system for performing a method in accordance with an embodiment of the invention.

A system 600 for performing the present invention is schematically illustrated in FIG. 6. The system includes a data source 60 which, for method 400, may contain a recorded seismic dataset. For method 100, the data source may contain a synthetic seismic dataset generated by a low-order FD modeling operator. The data source is in communication with the computer processor 62. The processor 62 is configured to receive the data and to execute modules compiled from computer-readable code. These modules may include the domain transformation module 65, which may be capable of transforming data from the time domain to the frequency domain and from the frequency domain to the time domain. The transformation may be done, for example, by a forward and inverse fast Fourier transform. The modules may also include the filter application module 66, that applies a frequency-domain time varying filter. For method 400, the modules may also include the reverse time migration module 67. The processor 62 is in communication with the user interface 69. The user interface 69 may be used both to display data and processed data products and to allow the user to select among options for implementing aspects of the method. The processed data products from processor 62 may be stored on data source 60.

While in the foregoing specification this invention has been described in relation to certain preferred embodiments thereof, and many details have been set forth for purpose of illustration, it will be apparent to those skilled in the art that the invention is susceptible to alteration and that certain other details described herein can vary considerably without departing from the basic principles of the invention. In addition, it should be appreciated that structural features or method steps shown or described in any one embodiment herein can be used in other embodiments as well.

What is claimed is:

1. A computer-implemented method for accounting for temporal dispersion in low-order finite difference seismic wave propagation, comprising:
    a. transforming, by a computer processor, a seismic dataset containing artifacts caused by temporal dispersion from time domain to frequency domain to obtain a frequency-domain seismic dataset;
    b. applying, by a computer processor, a frequency-domain time varying filter based on an effective phase velocity to the frequency-domain seismic dataset to obtain a filtered frequency-domain seismic dataset; and
    c. transforming, by a computer processor, the filtered frequency-domain seismic dataset from the frequency domain to the time domain to obtain a time-domain filtered seismic dataset, wherein the artifacts caused by temporal dispersion have been reduced in the time-domain filtered seismic dataset.

2. The method of claim 1, wherein the seismic dataset is a synthetic seismic dataset generated by a low-order finite difference modeling operator.

3. The method of claim 2, wherein the low-order finite difference modeling operator is a second-order finite difference modeling operator.

4. The method of claim 1, wherein the seismic dataset is a recorded seismic dataset.

5. The method of claim 4, further comprising using the time-domain filtered seismic dataset as input for reverse time migration.

6. The method of claim 5, wherein the reverse time migration uses the filtered frequency-domain seismic dataset as input.

7. The method of claim 5, wherein the reverse time migration uses a low-order finite difference modeling operator.

8. The method of claim 7, wherein the low-order finite difference modeling operator is a second-order finite difference modeling operator.

9. A system for accounting for temporal dispersion in seismic processing methods using low-order finite difference modeling, comprising:
    a. a device for providing information representative of the subterranean area of interest; and
    b. a computer processor in communication with the device and configured to receive the data containing artifacts caused by temporal dispersion and to execute a computer executable code responsive to the data, the computer executable code comprising:
        i. a domain transformation module for transforming from a time domain to a frequency domain and/or from the frequency domain to the time domain; and
        ii. a frequency-domain filter application module for applying a frequency-domain time varying filter based on an effective phase velocity, wherein the transforming and applying the frequency-domain time varying filter reduce the artifacts caused by temporal dispersion.

10. The system of claim 9, further comprising a user interface.

11. The system of claim 9, wherein the information representative of the subterranean area of interest comprises a synthetic seismic dataset generated by a low-order finite difference modeling operator.

12. The system of claim 9, wherein the information representative of the subterranean area of interest comprises a recorded seismic dataset.

13. The system of claim 9, further comprising a reverse time migration module.

14. The system of claim 13, wherein the reverse time migration module uses a low-order finite difference modeling operator.

15. An article of manufacture including a computer readable medium having computer readable code on it, the computer readable code being configured to implement a method for accounting for temporal dispersion in low-order finite difference seismic wave propagation, the method comprising:
    a. transforming a seismic dataset containing artifacts caused by temporal dispersion from time domain to frequency domain to obtain a frequency-domain seismic dataset;
    b. applying a frequency-domain time varying filter based on an effective phase velocity to the frequency-domain seismic dataset to obtain a filtered frequency-domain seismic dataset; and
    c. transforming the filtered frequency-domain seismic dataset from the frequency domain to the time domain to obtain a time-domain filtered seismic dataset, wherein the artifacts caused by temporal dispersion have been reduced in the time-domain filtered seismic dataset.

* * * * *